Jan. 30, 1968   J. D. KANE, JR., ET AL   3,366,905
RESOLVER

Filed June 16, 1965   2 Sheets-Sheet 1

JOHN D. KANE, JR.
FRED B. MANGEL
INVENTORS.

KENDRICK, SUBKOW and STOLZY
BY
A. Donald Stolzy
ATTORNEYS

Jan. 30, 1968 J. D. KANE, JR., ET AL 3,366,905
RESOLVER
Filed June 16, 1965 2 Sheets-Sheet 2

JOHN D. KANE, JR.
FRED B. MANGEL
INVENTORS.

KENDRICK, SUBKOW and STOLZY
BY
ATTORNEYS

United States Patent Office 3,366,905
Patented Jan. 30, 1968

3,366,905
RESOLVER
John D. Kane, Jr., 18341 W. Coastline Drive, Malibu, Calif. 90265, and Fred B. Mangel, 801 Bungalow, El Segundo, Calif. 90245
Filed June 16, 1965, Ser. No. 464,433
3 Claims. (Cl. 336—123)

ABSTRACT OF THE DISCLOSURE

The resolver stator consists of a hollow paramagnetic cylinder with a number of longitudinally extending slots in the body wall. The slots open at one end and receive coil windings around each of the sections. A paramagnetic rotor has a winding, the axis of which is arranged perpendicular to the stator cylinder axis.

---

This invention relates to devices for producing alternating output signals of amplitudes proportional to the trigonometric sine and cosine of the angular position of a rotatable shaft and more particularly to an accurate synchro resolver of a simplified construction.

Although the device of the present invention may be employed in a resolver construction, it is not limited thereto due to the fact that it may have utility in other applications.

In the past, resolvers have been constructed of many individual component parts. The assembly time and accuracy of these prior art devices have been adversely affected by their complicated construction.

In accordance with the device of the present invention, the above-described and other disadvantages of the prior art are overcome by providing a resolver stator having a pair of paramagnetic members connected at their ends by an integral transverse portion. The resolver of the present invention is therefore easier to fabricate and to assemble than prior art resolvers. Further, it is unusually accurate in operation.

It is a feature of the present invention that a hollow paramagnetic cylinder may be employed for the stator, the cylinder being open at one end and closed at the other. The cylinder wall is provided with a plurality of longitudinal slots through it defining resolver core pieces therebetween.

In accordance with another feature of the present invention, two oppositely disposed U-shaped paramagnetic members are employed for a resolver stator.

The above-described and other advantages of the present invention will be better understood from the following description when considered in connection with the accompanying drawings.

In the drawings which are to be regarded as merely illustrative:

Figure 1:
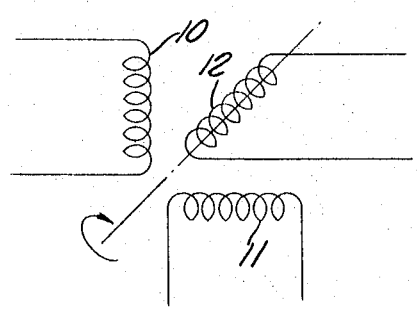
FIG. 1 is a schematic diagram of a resolver.

In the drawing in FIG. 1, a diagrammatic view of a conventional resolver is shown including stator windings at 10 and 11 and a rotor winding at 12. Note will be taken that rotor winding 12 is mechanically rotatable. Rotor winding 12 is energized by an alternating voltage. The magnitude of the induced voltages in the stator windings 10 and 11 are respectively proportional to the sine and cosine of the angular position of rotor winding 12 with respect to a line parallel to the axis of stator winding 11. The axes of windings 10 and 11 are perpendicular.

Figure 2:
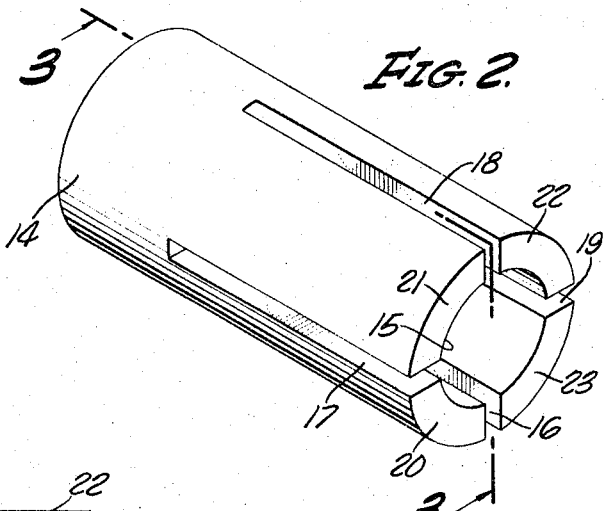
FIG. 2 is a perspective view of a resolver stator body constructed in accordance with the present invention.
Figure 3:
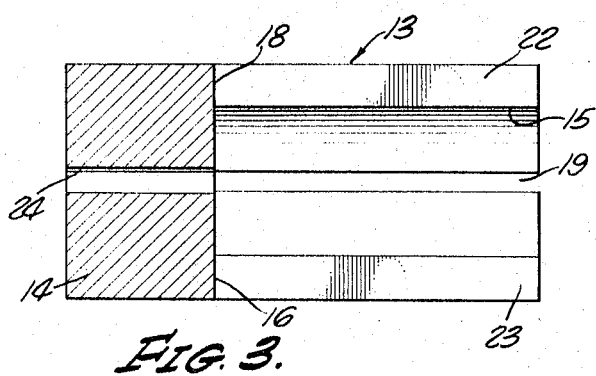
FIG. 3 is a longitudinal sectional view of the body taken on the line 3—3 shown in FIG. 2.
Figure 4:
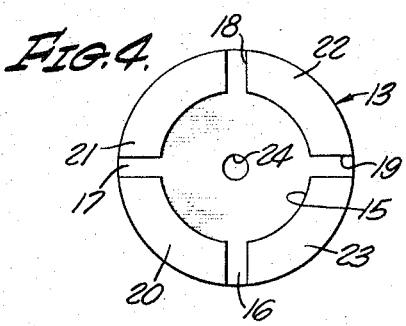
FIG. 4 is an end elevational view of the body shown in FIGS. 2 and 3.

A paramagnetic body to receive stator windings is provided, in accordance with the present invention, as shown in FIGS. 2, 3 and 4. This body is indicated at 13. Body 13 is a hollow cylinder having a partially closed end at 14 and an open end at 15. Body 13 has slots at 16, 17, 18 and 19 which define core pieces 20, 21, 22 and 23 upon which stator windings may be wound.

As shown in FIGS. 3 and 4, closed end 14 of body 13 has a cylindrical hole 24 therethrough to receive a rotor shaft.

Figure 5:
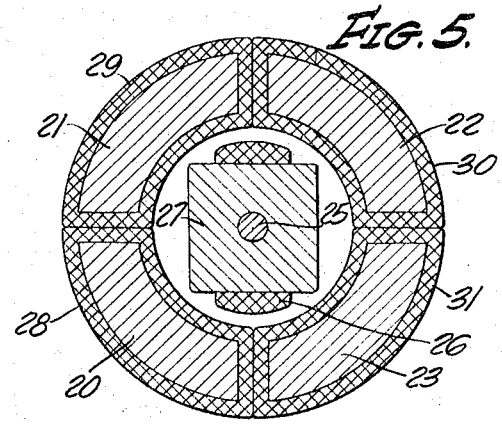
FIG. 5 is an enlarged end elevational view of the resolver stator body, a resolver rotor body, and windings on both of the bodies.

A rotor shaft is indicated at 25 in FIG. 5 which carries a paramagnetic rotor body 27 having a rotor winding 26 therearound.

Core pieces 20, 21, 22 and 23, respectively, are provided with stator windings 28, 29, 30 and 31.

Figure 6:
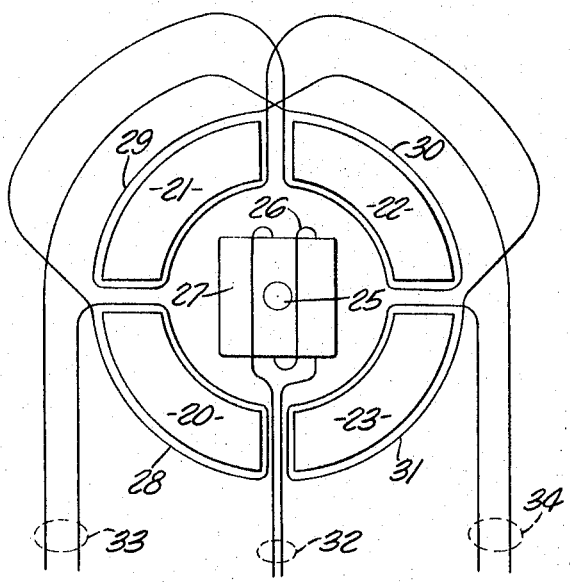
FIG. 6 is a diagrammatic view of the structure shown in FIG. 5.

The manner in which windings 27, 28, 29, 30 and 31 are wound around the rotor core and stator core pieces is shown in FIG. 6.

The ends of the rotor winding 27 are labeled 32. The ends of one stator are labeled 33. The ends of the other stator winding are labeled 34.

Figure 7:
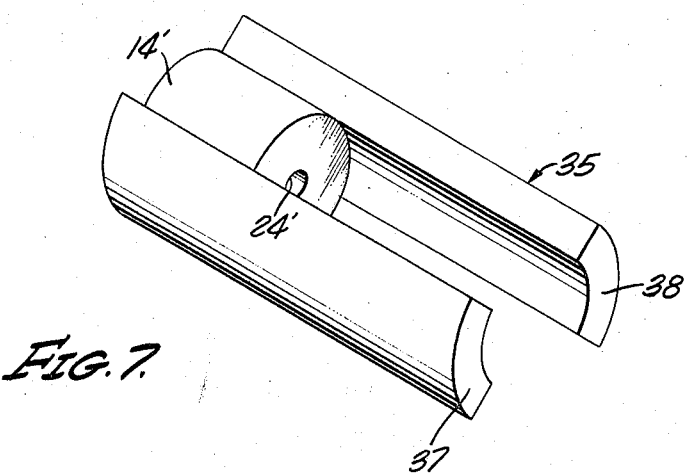
FIG. 7 is a perspective view of another embodiment of the stator body of the present invention.
Figure 9:
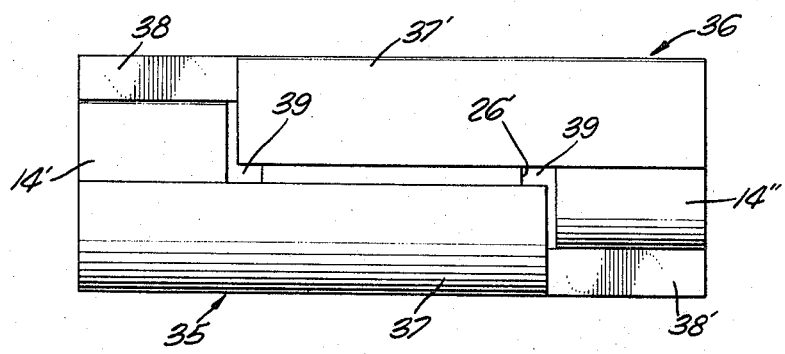
FIG. 9 is a side elevational view of a resolver rotor and stator employing two stator pieces of the type shown in FIGS. 7 and 8.
Figure 8:
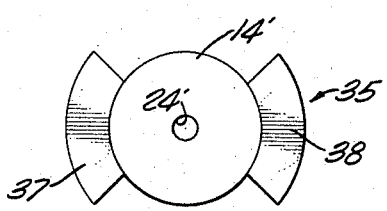
FIG. 8 is an end elevational view of the body shown in FIG. 7.

An alternative embodiment of the invention is shown in FIGS. 7, 8 and 9. In this embodiment of the invention, the stator is formed of two bodies 35 and 36 which are identical. Body 35 is shown in FIGS. 7 and 8. Note will be taken that stator core pieces are provided at 37 and 38 which are identical to core pieces 21 and 23. However, core pieces 20 and 22 have been removed altogether. Further, the diameter of end 14' corresponding to closed cylinder end 14 has a diameter smaller than end 14 except at the positions of core pieces 37 and 38. As before, closed end 14' has a rotor shaft hole 24'.

The resolver shown in FIG. 9 has a rotor 26'.

Body 36 has stator core pieces 37' and 38' identical to stator core pieces 37 and 38. Body 36 also has a closed end portion 14" identical to closed end portion 14'.

Stator 26' may have a shaft 39 which extends in identical holes in closed ends 14' and 14" of bodies 35 and 36, respectively. Bodies 35 and 36 may be cemented together with a conventional epoxy or the like. In this case, they would be maintained in fixed mechanical positions relative to each other. However, direct contact would be avoided to maintain independent magnetic circuits.

Conventional resolver equipment, not shown, may be employed with the structures disclosed herein. For example, a conventional metal resolver housing or case with rotor shaft bearings may be employed. Conventional rotor lead slip rings may also be employed if desired or necessary.

In accordance with the foregoing, it will be appreciated that the integrally molded stator core pieces 20, 21, 22 and 23 provide a construction that is easier to fabricate and easier to assemble than those of prior art resolvers. Note will be taken that core pieces 20, 21, 22 and 23 may be molded integrally with closed end portion 14 of body 13. Slots 16, 17, 18 and 19 may be cut in body 13 by a simple milling process. The construction of stator core bodies 35 and 36 is also similarly uncomplicated.

Note will be taken that the resolver shown in FIGS. 7, 8 and 9 provides unusually accurate output signals due to the fact that the magnetic circuits of two separate stator windings are maintained independent of each other.

The manner in which magnetic flux links the cores and windings is as follows. Flux passes through a core such as core 20, to the right as viewed in FIG. 3. Flux from core 20 then passes through rotor body 26 to core 22. Flux then passes to the left in core 22 as shown in FIG. 3 through cylinder end 14 and again to the right through core 20. The flux path through cores 21 and 23 is similar.

The phrase "paramagnetic material," as used herein, describes the material of cores 20, 21, 22 and 23 cylinder end 14. It also describes the material of rotor body 27 and the alternative embodiment shown in FIGS. 7, 8 and 9. The materials of these structures are generally ferromagnetic. The phrase "paramagnetic material" therefore includes ferromagnetic materials.

Although only two embodiments of the present invention have been described and illustrated herein, many changes and modifications thereof will of course suggest themselves to those skilled in the art. The present invention should therefore not be limited to the embodiments selected for this disclosure, the true scope of the invention being defined only in the appended claims.

What is claimed is:

1. A resolver comprising: a stator including a paramagnetic cylinder hollow at one end, said cylinder having four longitudinal slots extending through the wall thereof at said one end, said one end thereby being divided into four sections; coil windings positioned around each of said sections; and a rotor inside the said one end of said cylinder, said rotor including a paramagnetic core having a winding thereon, the axis of said rotor winding being perpendicular to that of said cylinder.

2. A resolver comprising: a stator having two elongated oppositely disposed pairs of paramagnetic poles, said poles in each pair having an integral end connecting portion of a paramagnetic material; a stator winding around each of said poles; and a rotor including a paramagnetic body rotatable inside said poles and a rotor winding fixed around said body.

3. A resolver comprising: a stator including two U-shaped paramagnetic bodies, each of said bodies having a pair of legs, legs of one pair being disposed alternately between legs of the other pair, said bodies being positioned in opposed symmetrical relation; a winding around each of said legs; and a rotor surrounded by said bodies, said rotor including a core having a winding thereon, said rotor winding having an axis perpendicular to that of said stator.

References Cited

UNITED STATES PATENTS 2,838,737  6/1958  Duncan _____ 336—221

OTHER REFERENCES

Konig, German Printed Application No. 1,083,921 Published June 23, 1960, 336–212.

Ferromagnetism, Bozorth, R. M. D. Van Nostrand Co., Inc., Princeton, N.J., 1961, p. 6. 1 copy in Group 215.

LEWIS H. MYERS, *Primary Examiner.*

D. TONE, H. COLLINS, *Assistant Examiners.*